United States Patent
Ao et al.

(10) Patent No.: US 7,984,637 B2
(45) Date of Patent: Jul. 26, 2011

(54) SYSTEM AND METHOD FOR FIELD CALIBRATION OF FLOW METERS

(75) Inventors: Xiaolei S. Ao, Lexington, MA (US); Jeffrey Tilden, Norton, MA (US)

(73) Assignee: General Electric Company, Schenectady, NY (US)

( * ) Notice: Subject to any disclaimer, the term of this patent is extended or adjusted under 35 U.S.C. 154(b) by 520 days.

(21) Appl. No.: 11/774,215

(22) Filed: Jul. 6, 2007

(65) Prior Publication Data

US 2009/0007625 A1 Jan. 8, 2009

(51) Int. Cl.
    *G01F 25/00* (2006.01)
(52) U.S. Cl. .......................................... 73/1.16
(58) Field of Classification Search ................... 73/1.16, 73/1.82, 861, 861.27, 861.28, 861.29
    See application file for complete search history.

(56) References Cited

U.S. PATENT DOCUMENTS

| | | | | |
|---|---|---|---|---|
| 3,981,191 A | * | 9/1976 | Brown et al. | 73/861.28 |
| 4,509,373 A | * | 4/1985 | Brown | 73/861.28 |
| 4,762,012 A | * | 8/1988 | Brown | 73/866.4 |
| 4,989,446 A | * | 2/1991 | Conti | 73/1.16 |
| 5,748,504 A | * | 5/1998 | Fletcher-Haynes | 702/100 |
| 7,506,532 B2 | * | 3/2009 | Funck et al. | 73/1.16 |

OTHER PUBLICATIONS

DigitalFlow™ GF868 Panametrics Flare Gas Mass Ultrasonic Flowmeter, Copyright 2005 GE.
"How much do you flare?", Process, worldwide Mar. 2006, pp. 18-19.
Flare Gas Flowmeter Service TCED and AQMD compliant, Copyright 2004 GE.

* cited by examiner

*Primary Examiner* — Hezron E Williams
*Assistant Examiner* — Tamiko Bellamy
(74) *Attorney, Agent, or Firm* — Mark A. Conklin; Global Patent Operation

(57) ABSTRACT

A calibration system for a flow meter includes a flow simulator, the flow simulator including a receiver configured to receive flow meter transducer signals from a flow meter. A simulation subsystem is configured to create simulated transit time signal pulses, and to transmit the simulated transit time signal pulses to the flow meter at preselected time intervals. A calibration subsystem is configured to receive from the flow meter a transit time differential value generated by the flow meter based on the simulated transit time signal pulses and output a calibration factor to the flow meter.

68 Claims, 7 Drawing Sheets

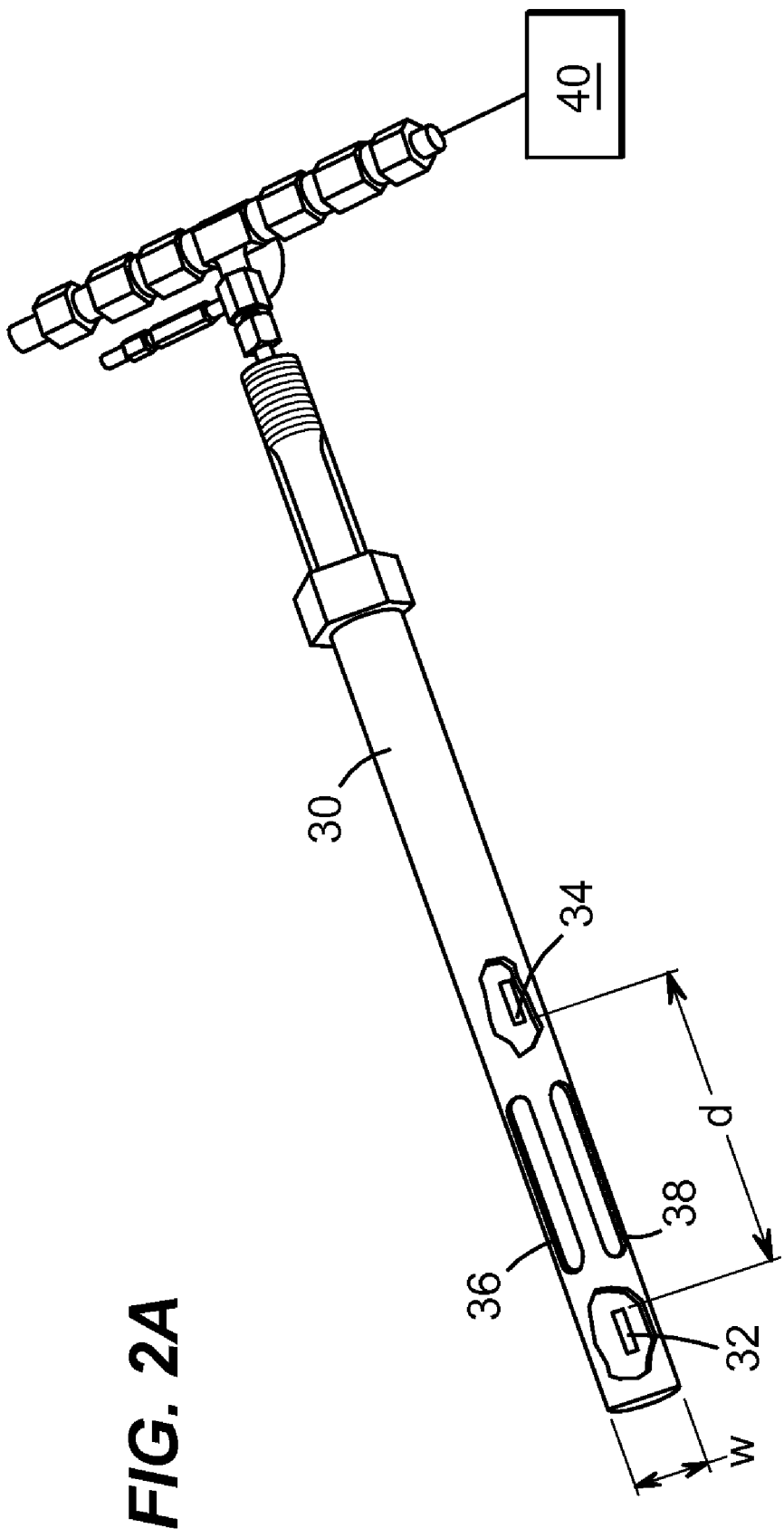

SYSTEM AND METHOD FOR FIELD CALIBRATION OF FLOW METERS

FIELD OF THE INVENTION

The embodiments of subject invention relate to a system and method for field calibration of flow meters, and in one example, field calibration of flare gas flow meters.

BACKGROUND OF THE INVENTION

Flow meters and flow meter systems are utilized to measure properties of fluids flowing in pipes or conduits. One particular property of interest is the flow rate or velocity of the fluid. Ultrasonic transducers are often employed to measure flow velocity based on the transit time of ultrasonic signals transmitted through the fluid.

Typically, a flow meter measures flow velocity using two transducers which are located upstream and downstream from each other on a pipe or conduit. Each transducer transmits and receives in an alternating manner. Flow velocity is then computed as a function of the transit times of the ultrasonic signals both with and against the direction of flow, i.e. the difference between the upstream and downstream transit times. For example, in the presence of a flow, the transit time signal pulse transmitted from the upstream transducer to the downstream transducer is faster than the pulse transmitted from the downstream transducer to the upstream transducer. By subtracting the transit time from the downstream transducer to the upstream transducer from the transit time from the upstream transducer to the downstream transducer, the transit time differential $\Delta t$ is calculated. Utilizing other known parameters such as the conduit dimensions and ultrasonic signal path length, and the measured speed of sound in the fluid, flow velocity can thus be determined. The general principle of transit time measurement in ultrasonic flow meters is fairly well known.

Fluid flow measurements often provide the basis for cash transfers between businesses, where sales of resources may ultimately depend on the accuracy of flow rate measurements. Moreover, accurate flow rate measurement can provide valuable information about industrial processes such as chemical or combustion processes, and the information can serve as the basis for optimization and control. For instance, once fluid flow velocity is calculated other fluid qualities may also be determined, such as the volumetric flow rate Q, which is a function of velocity and pipe area, and/or the mean molecular weight of the fluid. The latter quality is a good indicator of the efficiency of certain chemical processes. By monitoring this quality, chemical processes can be optimized. In one example, the assignee herein provides an ultrasonic flow meter, Model No. GF868, to monitor flare gas emitted into the atmosphere. This flow meter is generally used to measure flow rate for chemical processing industries. With better than 5% accuracy, it provides an efficient, cost-effective and accurate means to monitor flare gas emissions.

Certain states such as Texas and California, however, as well as certain European countries, require that flare gas flow meters be calibrated at least annually to assure that emissions are well monitored and controlled. There are other circumstances where calibration of flow meters in general may also be required or desired. Additionally, in many typical flow meters, erosion or contaminant deposits over time can cause the flow meter transducer signals to deteriorate, which can result in less precise flow rate measurements.

It is typically cost prohibitive to remove a spool piece or portion of a pipe for offsite calibration, because of the great expenditure of time and resources and resulting system down time.

One known approach to calibrating flow meters includes use of calipers and a CMM (Coordinate Measuring Machine) to correct speed of sound measurements. Zero calibration of the flow meter is effected by removing the flow meter transducers from the conduit flow line and placing them into a "black box" with no flow. This method is cumbersome, however, and difficult to use in the field.

Also, as a practical matter it may not be possible to calibrate the flow meter across the limits of a system's specified flow velocity range, for example at the maximum flow rate—which can be as high as 300 feet/second—because such conditions may not be present during normal operation or at the time of calibration.

SUMMARY OF THE INVENTION

Embodiments of this invention provide cost-effective, less complex, and more precise calibration of flow meters in the field. Since transit times are principally a function of the ultrasonic signal paths and the speed of sound in the fluid, accurate sound speed measurement is important in order to obtain an accurate flow rate or velocity measurement.

In the various embodiments of this invention, the applicants' system and method provides for more accurate sound speed measurement and calibration, which in and of itself may provide requisite accuracy. In addition, however, various embodiments of this invention also include improved transit time measurement and calibration. The improved calibration associated with various embodiments of this invention can be performed on site, without undue intrusion into existing systems, and with little to no downtime. The embodiments of the system and method of the subject invention are not limited to any particular type of flow meters or applications, but may be utilized with any flow meter where an accurate sound speed and/or transit time differential $\Delta t$ reference is required or desired.

The subject invention, however, in other embodiments, need not achieve all these objectives and the claims hereof should not be limited to structures or methods capable of achieving these objectives.

The subject invention features a calibration system for a flow meter, the calibration system including a flow simulator comprising a receiver configured to receive flow meter transducer signals from a flow meter and a simulation subsystem configured to create simulated transit time signal pulses and to transmit the simulated transit time signal pulses to the flow meter at preselected time intervals. A calibration subsystem is configured to receive from the flow meter a transit time differential value generated by the flow meter based on the simulated transit time signal pulses and output a calibration factor to the flow meter. The preselected time interval may be representative of a transit time differential value for a particular type of fluid flowing at a known velocity. In one embodiment the receiver is configured to receive transmitted flow meter transducer signals from the flow meter, and the simulation subsystem is configured to create the simulated transit time signal pulses using the transmitted flow meter transducer signals received from the flow meter. The calibration subsystem may be further configured to compare the transit time differential value generated by the flow meter to a preselected time interval to compute the calibration factor. In one example the calibration subsystem is configured to receive from the flow meter a fluid flow velocity value generated by the flow meter based on the simulated transit time signal pulses, and further configured to compare the fluid flow velocity value generated by the flow meter to a fluid flow velocity value calculated by the flow simulator to compute the calibration factor. The calculated flow velocity may be representative of velocity for a particular type of fluid at a preselected time interval. The calibration factor may adjust the transit time differential value generated by the flow meter, or adjust the fluid flow velocity value generated by the flow meter.

In one variation, the simulated transit time signal pulses are based on actual flow meter transit time signal pulses from the flow meter. Also, the simulation subsystem may be further configured to distort the simulated transit time signal pulses to simulate noise factors interfering with the pulses, and/or configured to modulate signal qualities of the simulated transit time signal pulses. The signal qualities which may be modulated include amplitude and/or frequency.

In one embodiment, the calibration system includes a probe for insertion into a conduit with fluid flowing therein and a processing subsystem connected to the probe and configured to calculate sound speed in the fluid and to output a sound speed correction factor to the flow meter. The probe is shaped to fit into an opening in the conduit. In one variation, the probe includes at least two transducers spaced a fixed distance apart and at least one aperture for the fluid to flow through the probe, the probe transducers configured to transmit and receive ultrasonic signals and to output transit time signals. The probe transducers typically define an ultrasonic signal path through the fluid. In another variation, the probe includes at least one transducer and a reflector spaced a fixed distance apart and at least one aperture for the fluid to flow through the probe, the one probe transducer configured to transmit ultrasonic signals, receive ultrasonic signals reflected back from the reflector, and to output transit time signals.

In one configuration, the processing subsystem is further configured to excite the probe transducers and respond to the transit time signals output by the probe transducers to calculate the sound speed in the fluid. The processing subsystem is typically also configured to receive from the flow meter a fluid sound speed value determined by the flow meter, and to compare the fluid sound speed value determined by the flow meter to the calculated sound speed to compute the sound speed correction factor.

The flow meter may be a flare gas flow meter and the fluid may be a flare gas. The probe is portable, and may be precalibrated, and in one example the probe is less than or equal to ¾ inches in diameter or width. The probe transducers may be moveable within the probe, or the reflector may be moveable within the probe. In such variations, the processing subsystem is further configured to output a series of sound speeds representing a fluid sound speed profile.

The subject invention also features a calibration system for a flow meter, the calibration system including a flow simulator which includes a receiver configured to receive transmitted flow meter transducer signals from a flow meter and a simulation subsystem configured to create simulated transit time signal pulses using the transmitted flow meter transducer signals received from the flow meter, and to transmit the simulated transit time signal pulses to the flow meter at preselected time intervals. A calibration subsystem is configured to receive from the flow meter a transit time differential value generated by the flow meter based on the simulated transit time signal pulses, compare the transit time differential value generated by the flow meter to a preselected time interval to compute a calibration factor to adjust the transit time differential value generated by the flow meter, and output the calibration factor to the flow meter.

The subject invention further features a calibration system for a flow meter, the calibration system including a flow simulator including a receiver configured to receive flow meter transducer signals from a flow meter and a simulation subsystem configured to create simulated transit time signal pulses based on actual transit time signal pulses from the flow meter, and to transmit the simulated transit time signal pulses to the flow meter at preselected time intervals. A calibration subsystem is configured to receive from the flow meter a transit time differential value generated by the flow meter based on the simulated transit time signal pulses, compare the transit time differential value generated by the flow meter to a preselected time interval to compute a calibration factor, and output the calibration factor to the flow meter.

The subject invention also features a calibration system for a flow meter including a probe for insertion into a conduit with fluid flowing therein, a processing subsystem connected to the probe and configured to calculate sound speed in the fluid and to output a sound speed correction factor to the flow meter. The system further includes a flow simulator comprising a receiver configured to receive flow meter transducer signals from the flow meter, a simulation subsystem configured to create simulated transit time signal pulses and to transmit the simulated transit time signal pulses to the flow meter at preselected time intervals, and a calibration subsystem. The calibration subsystem is configured to receive from the flow meter a transit time differential value generated by the flow meter based on the simulated transit time signal pulses, and output a calibration factor to the flow meter.

The subject invention also features a calibration system for a flow meter comprising a probe including at least two transducers spaced a fixed distance apart and at least one aperture for fluid to flow through the probe, the transducers configured to transmit and receive ultrasonic signals and to output transit time signals. A processing subsystem excites the probe transducers and is responsive to the transit time signals, and is configured to calculate sound speed in a fluid flowing through the probe, and to output a sound speed correction factor to a flow meter. The system also includes a flow simulator comprising a receiver configured to receive transmitted flow meter transducer signals from the flow meter, a simulation subsystem configured to create simulated transit time signal pulses using the transmitted flow meter transducer signals received from the flow meter and to transmit the simulated transit time signal pulses to the flow meter at preselected time intervals, and a calibration subsystem. The calibration subsystem is configured to receive from the flow meter at least one of a transit time differential value and a fluid flow velocity value generated by the flow meter based on the simulated transit time signal pulses, and output a calibration factor to the flow meter.

The subject invention also features a calibration method for a flow meter including receiving flow meter transducer signals from a flow meter, creating simulated transit time signal pulses and transmitting the simulated transit time signal pulses to the flow meter at preselected time intervals, receiving from the flow meter a transit time differential value generated by the flow meter based on the simulated transit time signal pulses, and outputting a calibration factor to the flow meter. The preselected time interval may be representative of a transit time differential value for a particular type of fluid flowing at a known velocity. In one example the flow meter transducer signals received are transmitted flow meter transducers signals, and the simulated transit time signal pulses are created using the transmitted flow meter transducer signals received from the flow meter. The method may further include comparing the transit time differential value generated by the flow meter to a preselected time interval to compute the calibration factor. Alternately or in addition, the method may include receiving from the flow meter a fluid flow velocity value generated by the flow meter based on the simulated transit time signal pulses, and comparing the fluid flow velocity value generated by the flow meter to a fluid flow velocity calculated by the flow simulator to compute the calibration factor. The calculated flow velocity may be representative of velocity for a particular type of fluid at a preselected time interval. The calibration factor may adjust the transit time differential value generated by the flow meter, or may adjust the fluid flow velocity value generated by the flow meter. In one variation, the simulated transit time signal pulses are based on actual flow meter transit time signal pulses from the flow meter. In another variation, the method may include distorting the simulated transit time signal pulses to simulate noise factors interfering with the pulses, and/or modulating signal qualities of the simulated transit time signal pulses. The modulated signal qualities may include amplitude and/or frequency.

In one embodiment, the calibration method may further include inserting a probe into a conduit with fluid flowing therein, calculating the sound speed in the fluid, and outputting a sound speed correction factor to the flow meter. The probe is shaped to fit into an opening in the conduit, and in one configuration, the probe includes at least two transducers spaced a fixed distance apart and at least one aperture for the fluid to flow through the probe, the probe transducers configured to transmit and receive ultrasonic signals and to output transit time signals. The probe transducers typically define an ultrasonic signal path through the fluid. In another configuration, the probe includes at least one transducer and a reflector spaced a fixed distance apart and at least one aperture for the fluid to flow through the probe, the probe transducer configured to transmit ultrasonic signals, receive ultrasonic signals reflected back from the reflector, and to output transit time signals. The method may also include the steps of exciting the probe transducers and responding to the transit time signals output by the probe transducers to calculate the sound speed in the fluid, where calculating the sound speed in the fluid includes receiving from the flow meter a fluid sound speed value determined by the flow meter, and comparing the fluid sound speed value determined by the flow meter with the calculated sound speed to compute the sound speed correction factor.

The flow meter may be flare gas flow meter and the fluid may be a flare gas. The probe is typically portable and may be pre-calibrated. In one example, the probe is less than or equal to ¾ inches in diameter or width. The probe transducers may be moveable within the probe, or the reflector may be moveable within the probe. In such variations, the method may include outputting a series of sound speeds representing a fluid sound speed profile.

This invention further features a calibration method for a flow meter including receiving transmitted flow meter transducer signals from a flow meter, creating simulated transit time signal pulses using the transmitted flow meter transducer signals received from the flow meter and transmitting the simulated transit time signal pulses to the flow meter at preselected time intervals, receiving from the flow meter a transit time differential value generated by the flow meter based on the simulated transit time signal pulses, comparing the transit time differential value generated by the flow meter to a preselected time interval to compute a calibration factor to adjust the transit time differential value generated by the flow meter, and outputting the calibration factor to the flow meter.

This invention also features a calibration method for a flow meter including receiving flow meter transducer signals from a flow meter, creating simulated transit time signal pulses based on actual transit time signals pulses from the flow meter and transmitting the simulated transit time signal pulses to the flow meter at preselected time intervals, receiving from the flow meter a transit time differential value generated by the flow meter based on the simulated transit time signal pulses, comparing the transit time differential value generated by the flow meter to a preselected time interval to compute a calibration factor, and outputting the calibration factor to the flow meter.

This invention also features a calibration method for a flow meter including inserting a probe into an opening in a conduit with fluid flowing therein, calculating the sound speed in the fluid, and outputting a sound speed correction factor to a flow meter. The method further includes receiving flow meter transducer signals from the flow meter, creating simulated transit time signal pulses and transmitting the simulated transit time signal pulses to the flow meter at preselected time intervals, receiving from the flow meter a transit time differential value generated by the flow meter based on the simulated transit time signal pulses, and outputting a calibration factor to the flow meter.

This invention further features a calibration method for a flow meter including inserting a probe into an opening in a conduit with fluid flowing therein, the probe including at least two transducers spaced a fixed distance apart and at least one aperture for the fluid to flow through the probe, the transducers configured to transmit and receive ultrasonic signals and to output transit time signals. The method also includes exciting the probe transducers, responding to the transit time signals and calculating sound speed in the fluid flowing in the conduit through the probe, and outputting a sound speed correction factor to a flow meter. The method further includes receiving transmitted flow meter transducer signals from the flow meter, creating simulated transit time signal pulses using the transmitted flow meter transducer signals received from the flow meter, transmitting the simulated transit time signal pulses to the flow meter at preselected time intervals, receiving from the flow meter a transit time differential value generated by the flow meter based on the simulated transit time signal pulses, and outputting a calibration factor to the flow meter.

BRIEF DESCRIPTION OF THE SEVERAL VIEWS OF THE DRAWINGS

Other objects, features and advantages will occur to those skilled in the art from the following description of the embodiments and the accompanying drawings, in which:

FIG. 2A is a partially cut away schematic perspective view of one embodiment of a probe and processing subsystem in accordance with one aspect of the subject invention;

DETAILED DESCRIPTION OF THE INVENTION

Figure 1:
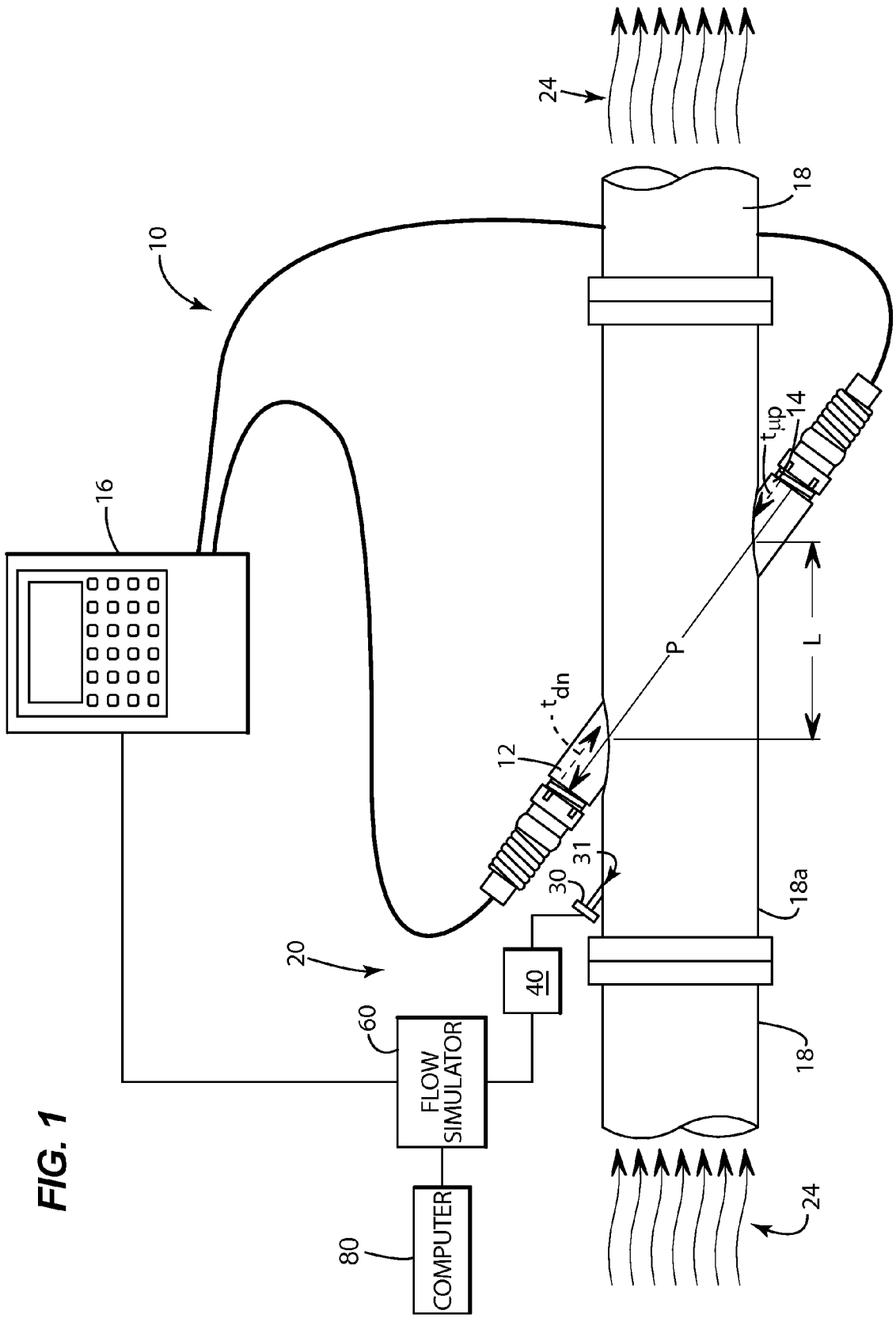
FIG. 1 is schematic perspective view of one embodiment of a calibration system for a flow meter in accordance with the subject invention.

Aside from the embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

One typical flow meter 10, FIG. 1 includes transducers 12 and 14 and associated processing and electronics 16. Transducers 12 and 14 are shown on opposite sides of pipe or conduit 18, but in various flow meters the transducers may be on the same side of the pipe, or there may be more than two transducers. As shown, conduit 18 includes spool piece 18a, which may be hot tapped into pipe 18. Other components may also be included in or with flow meter 10, or certain components may be excluded.

In one embodiment of the subject invention, flow meter calibration system 20 includes probe 30 and processing subsystem 40 for determining sound speed in fluid 24 flowing in conduit 18. In another embodiment flow meter calibration system 20 includes flow simulator 60 configured to simulate flow of a fluid, such as fluid 24 in one example. Other embodiments of flow meter calibration system 20 may include each of probe 30 and processing subsystem 40, as well as flow simulator 60, as discussed below. In each case, flow meter calibration system 20 calibrates flow meter 10 for improved accuracy of sound speed and/or velocity measurements in fluid 24, as well as other parameters which depend on such measurements. Although the embodiments of the subject invention are particularly suited to flare gas flow meters measuring flare gas, the invention is not so limited, and the embodiments of the system and method of the subject invention are not limited to use with any particular flow meter or a flow meter's particular configuration.

As noted in the Background section, a flow meter such as flow meter 10 measures fluid flow velocity of fluid 24 flowing in conduit 18 using two transducers 12 and 14, with transducer 12 located upstream and transducer 14 located downstream, each on or connected to pipe or conduit 18. Typically, each transducer 12, 14 is configured to transmit and receive ultrasonic signals in an alternating manner. The ultrasonic signals transmitted from one transducer are received by the other transducer and vice versa. Then, in combination with other known parameters, flow velocity of fluid 24 through conduit 18 can be computed as a function of the transit times of the ultrasonic signals both with and against the direction of flow, i.e. the difference between the upstream and downstream ultrasonic signal transit times.

For example, in the presence of flow 24, the transit time signal pulse $t_{dn}$ transmitted from upstream transducer 12 to downstream transducer 14 is not the same as pulse $t_{up}$ transmitted from downstream transducer 14 to upstream transducer 12. By finding the difference between the transit times, e.g. the difference between the times it takes the ultrasonic signal transmitted from downstream transducer 14 to arrive at upstream transducer 12 and the transit time it takes the ultrasonic signal transmitted from upstream transducer 12 to arrive at downstream transducer 14, $t_{up}-t_{dn}$, a transit time differential $\Delta t$ is calculated, where $\Delta t = t_{up}-t_{dn}$. Utilizing other known parameters such as the ultrasonic signal path length and conduit dimensions P and L, and the measured speed of sound c in the fluid, the flow velocity V of fluid 18 can thus be determined. In all cases, the fluid flow velocity is either a function of $\Delta t$ and/or a function of the speed of sound c in the fluid, e.g.

$$V = \frac{P^2}{2L}\left(\frac{t_{up} - t_{dn}}{t_{up} \cdot t_{dn}}\right) \cong \frac{c^2}{2L}\Delta t \quad (1)$$

It can be seen in the first instance that the speed of sound c in fluid 24 is an important factor in the determination of velocity V. Speed of sound c in fluid 24 is determined by the flow meter 10 using ultrasonic signal transit times. Erosion and degradation of flow meter components and/or deposits of contaminants accumulating over time, however, can adversely affect the accuracy of the sound speed determined by the flow meter, and consequently the fluid flow velocity V ascertained by the flow meter.

In one aspect of the invention, calibration system 20 includes probe 30 for insertion into conduit 18 with fluid 24 flowing therein. In one configuration probe 30 is shaped to fit into opening 31 in conduit 18. In one example, probe 30, FIG. 2A has a width or diameter w which is less than or equal to ¾ inches for insertion of probe 30 into conduit 18. While tapping an opening of greater than ¾ inches into an existing pipe is generally an expensive process requiring specialized personnel, under current regulations governing chemical process emissions, for example, conduit ports or openings up to ¾ inches made by operators of the processing plant where the pipe is located are permissible. Thus, no specialized personnel are required, and such a port or opening can be easily and inexpensively prepared to allow for insertion of the probe into the pipe. In fact, the pipes of many chemical processing plants, for example, include built-in ports of such size where the probe may be inserted.

In various embodiments, probe 30 is portable such that it can be taken into the field and used in a variety of locations. Also, probe 30 may itself be calibrated in the field or pre-calibrated, for instance by placing it in a medium such as distilled water and using the known speed of sound in water published by NIST (National Institute of Standards and Technology).

Figure 2B:
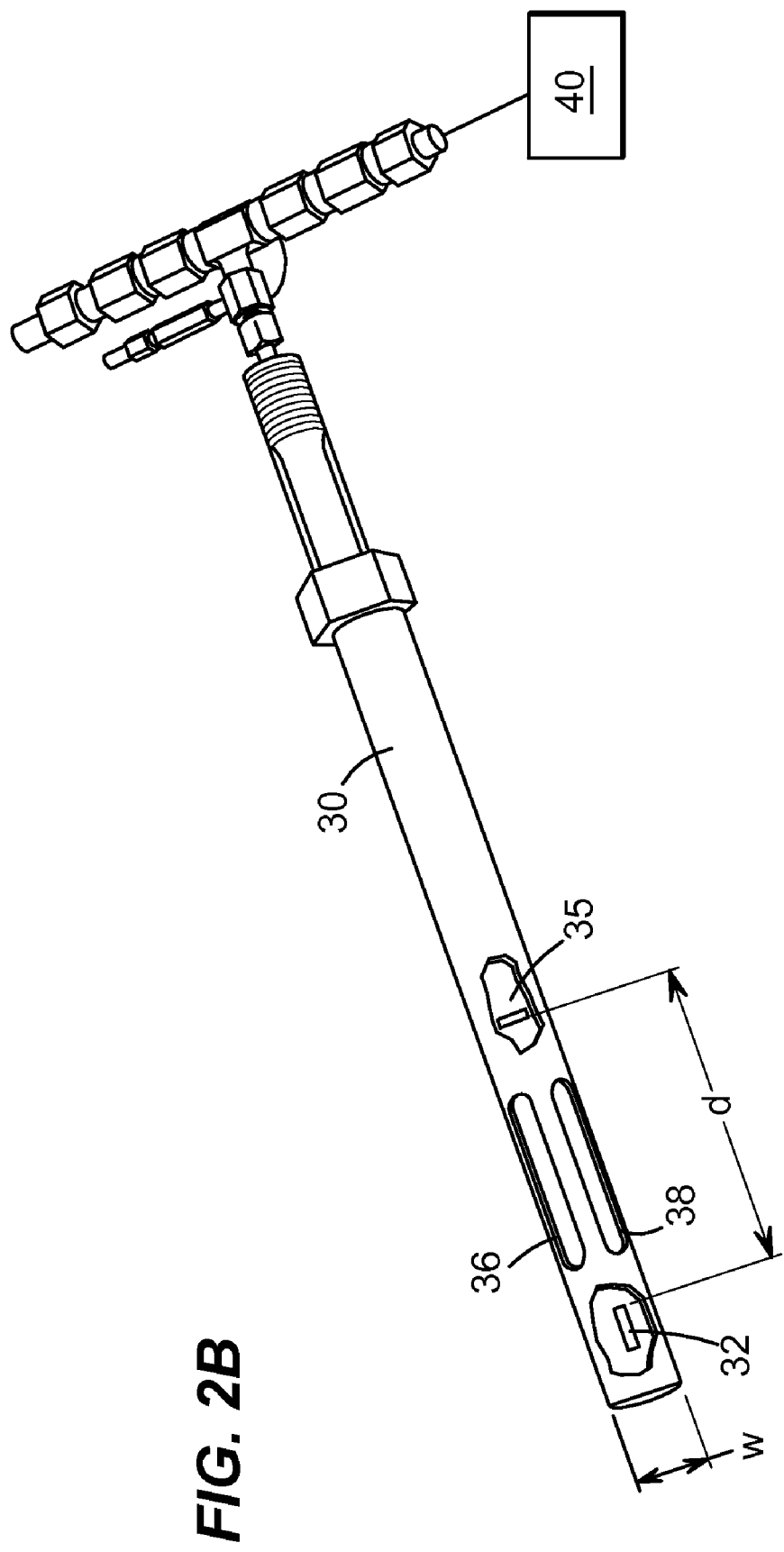
FIG. 2B is a partially cut away schematic perspective view of one embodiment of a probe including one transducer and one reflector in accordance with one aspect of the subject invention.

In one variation, probe 30 includes transducers 32 and 34, FIG. 2A a fixed distance d apart. Typically, probe transducers 32 and 34 are a transmitting transducer and receiving transducer pair, each configured to transmit and receive ultrasonic signals and to output transit time signals. Probe 30 also includes apertures 36 and 38 for fluid to flow through probe 30. Although the discussion refers to two transducers, it is to be understood that the number of transducers in probe 30, their distance apart, as well as the number of apertures, are all subject to variation depending a particular desired application. Also for example, probe transducers 32 and 34 may be moveable to alter or adjust their distance apart. Also in another configuration, one of the two transducers, for example transducer 34, may be replaced by reflector 35, FIG. 2B to reflect the ultrasonic signal transmitted by transducer 32 back to be received by transducer 32. The reflector may also be moveable. With a reflector, the ultrasonic signal path is doubled and the signal will typically be weaker, but it may be sufficiently strong for certain desired applications. In variations when the transducers are moveable, or when the reflector is moveable, processing subsystem 40 is configured to output a series of sound speeds representing a fluid sound speed profile.

Flow meter calibration system 20 including probe 30 also includes processing subsystem 40 connected to probe 30 and configured to calculate sound speed in fluid 24 and output a sound speed correction factor to flow meter 10. In one configuration, processing subsystem 40 excites at least one of probe transducers 32 and 34 to transmit an ultrasonic signal. When probe 30 is fit or inserted into opening 31, FIG. 1 in conduit 18, apertures 36 and 38, FIG. 2 allow fluid flowing in the conduit to also flow through probe 30. Probe transducers 32 and 34 thus define an ultrasonic signal path through the fluid. Utilizing many of the same principles described above with respect to flow meters and ultrasonic transducers, processing subsystem 40 is responsive to transit time signals output by probe transducers 32 and 34 and is configured to calculate sound speed $c_{probe}$ in fluid 24 and output a sound speed correction factor to flow meter 10. As shown, probe 30 and processing subsystem 40 are separate, but this is not a limitation of the invention, and both probe 30 and processing subsystem 40 may be part of or form one unit if desired.

In one example, calculated sound speed $c_{probe}$ of the fluid flowing in the conduit is calculated using fixed space or distance d between transducers and the average of the transit times $t_{avg}$ of the ultrasonic signals transmitted and received, respectively, by probe transducers 32 and 34, namely:

$$c_{probe} = \frac{d}{t_{avg}} \quad (2)$$

where $$t_{avg} = \frac{t_{32,34} + t_{34,32}}{2},$$

$t_{32,34}$ is the transit time from probe transducer 32 to probe transducer 34, and $t_{34,32}$ is the transit time from probe transducer 34 to probe transducer 32.

In addition, processing subsystem 40 is configured to receive from the flow meter a fluid sound speed value as determined by the flow meter, e.g. sound speed value c in the flow meter example above. To compute a sound speed correction factor for output to flow meter 10, processing subsystem 40 is typically configured to compare the fluid sound speed value determined by the flow meter, e.g. sound speed value c, with the calculated sound speed, e.g. $c_{probe}$. If sound speed value c is not equal to $c_{probe}$, the sound speed correction factor adjusts sound speed c up or down as necessary depending on the results of the comparison. If sound speed value c is indeed equal to $c_{probe}$, the sound speed correction factor could be, for example, 1, or zero, depending on whether the correction factor is a multiplier or additive.

Figure 3:
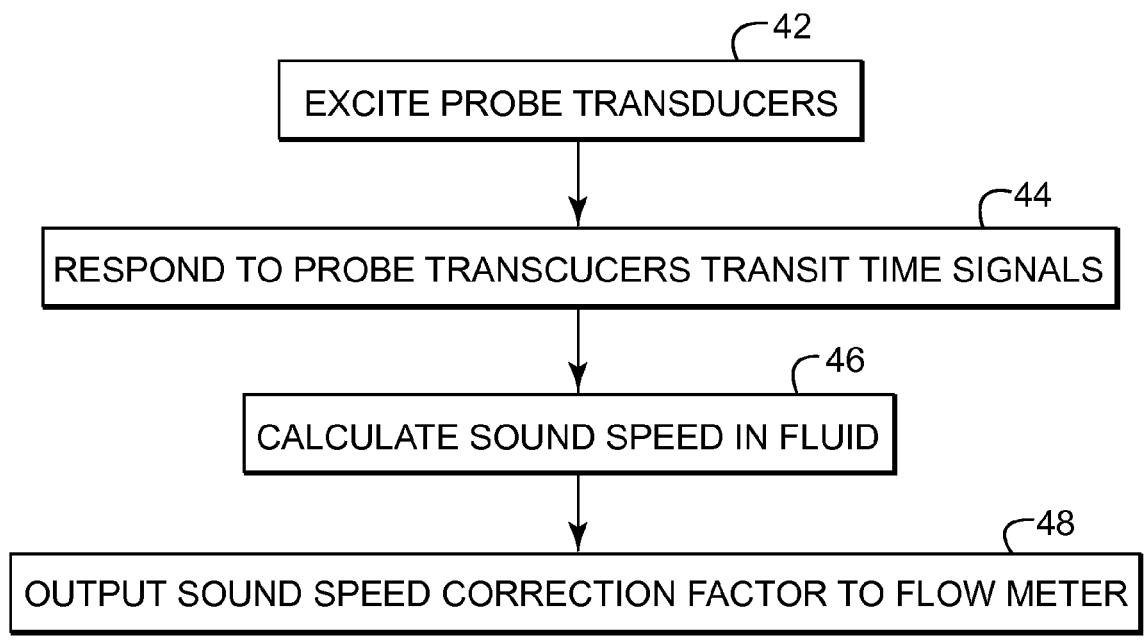
FIG. 3 is a schematic block diagram showing the primary processing steps of one embodiment of a processing subsystem in accordance with the present invention.

A summary of one configuration of the operation of processing subsystem 40 is shown in flowchart form in FIG. 3. Probe transducers 30 and 32 are excited to transmit ultrasonic pulses or signals, step 42, and processing system 40 responds to the probe transducers transit time signals, step 44, calculates the speed of sound in the fluid, step 46, and outputs a sound speed correction factor to the flow meter, step 48. Although the steps set forth in FIG. 3 are set forth in a particular sequence, it will be understood that this sequence is not limiting, and that steps may be undertaken simultaneously or out of order, steps may be eliminated or added in accordance with various embodiments, and that one or more steps may be achieved at least in part utilizing electronic circuitry.

For many purposes, the fluid sound speed calibration provided by probe 30 and processing subsystem 40 to the flow meter may be sufficient to ensure flow meter accuracy. If further or separate assurance of the precision of the flow meter is desired or required, however, additional embodiments of flow meter calibration system 20 may also include flow simulator 60, FIG. 4.

Figure 4:
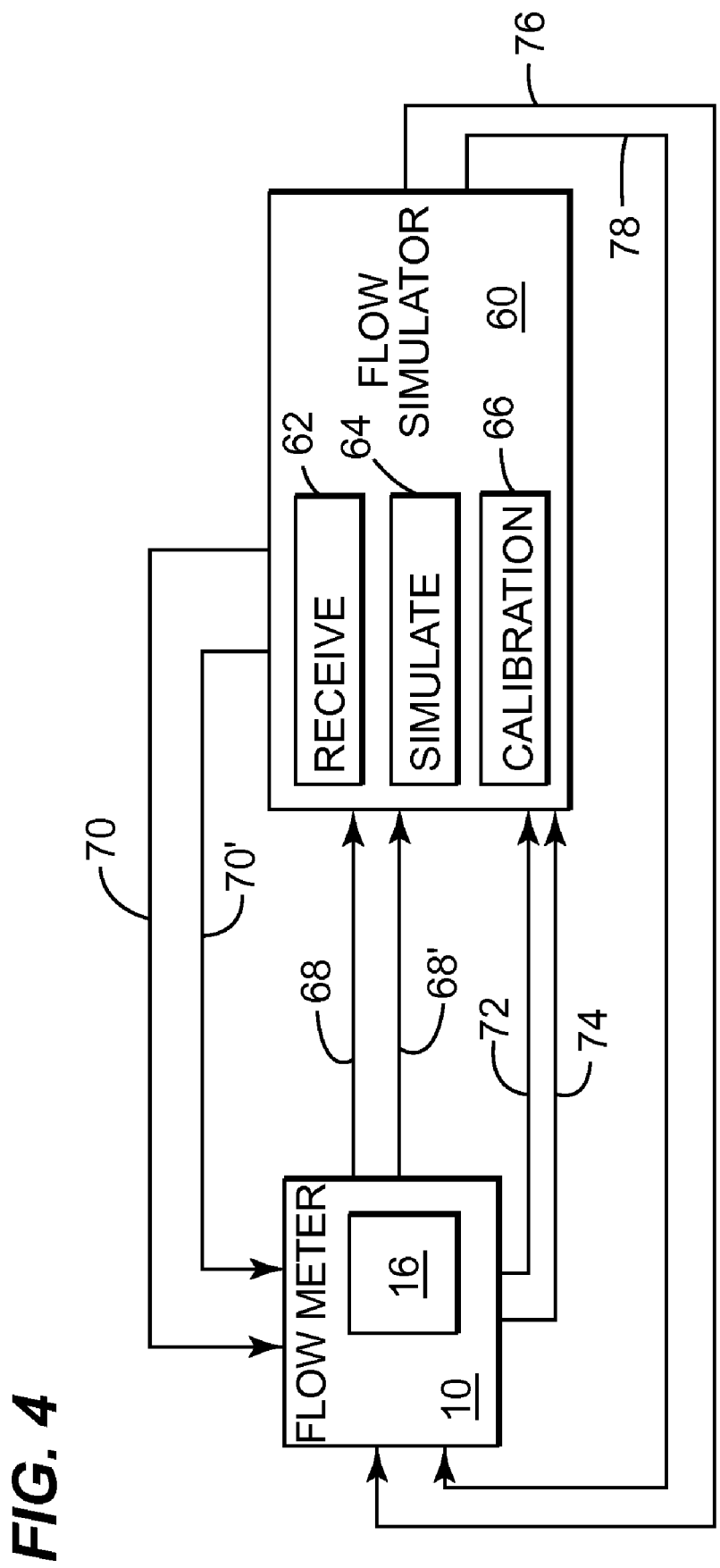
FIG. 4 is a schematic block diagram showing the primary components of one embodiment of a flow simulator in accordance with the subject invention.

In one embodiment, flow simulator 60, FIG. 4 is connected to flow meter processing and electronics 16 and includes receiver 62, simulation subsystem or module 64, and calibration subsystem or module 66. In typical flow meters, the upstream and downstream transducers are excited in order to produce and transmit the ultrasonic signals for transmission through the fluid flowing in the conduit. In one aspect of the subject invention, receiver 62 is configured to receive or capture flow meter transducer signals 68 and 68' from flow meter 10, typically transmitted flow meter transducer signals. Using flow meter transducer signals 68 and 68' such as transmitted flow meter transducer signals, simulation subsystem 64 is configured to create simulated transit time signal pulses 70 and 70' and transmit simulated transit time signal pulses 70 and 70' to flow meter 10 at preselected time intervals.

In one variation, simulated transit time signal pulses 70 and 70' are based on actual transit time signal pulses from flow meter 10, which have been captured and stored prior to calibration, and which are then later used by flow simulator 60 in its creation of simulated transit time signal pulses 70 and 70'. In this way, simulated signal pulses 70 and 70' are not pure, and since they are based on actual signals, will include signal characteristics peculiar to the particular flow meter which is the subject of the calibration.

In another variation, simulation subsystem 64 is further configured to distort simulated transit time signal pulses 70 and 70' to simulate noise factors which interfere with the pulses. In another aspect, simulation subsystem 64 is configured to modulate signal qualities of simulated transit time signal pulses 70 and 70', such as amplitude and/or frequency, for improved simulation and to create the various simulated signal pulses.

Also as discussed above, in typical flow meters a transit time differential or Δt value(s) is determined based on the transit time signals. Fluid flow velocity V is also determined by the flow meter. In this instance, because simulated transit time signal pulses 70 and 70' are sent to flow meter 10, the flow meter will determine the transit time differentials and/or the fluid flow velocity based on the simulated transit time signal pulses from the flow simulator. Calibration subsystem 66 is configured to receive or capture from flow meter 10 transit time differential value(s) (e.g. Δt or $t_{up}$–$t_{dn}$ value(s)) 72 generated by flow meter 10, and/or to receive or capture fluid flow velocity value(s) (e.g. V value(s)) 74 generated by flow meter 10, each of which are generated based on the simulated transit time signal pulses. Calibration subsystem 66 is further configured to output calibration factor(s) 76, 78 to flow meter 10. In order to compute the calibration factor, typically calibration subsystem 66 is further configured to compare transit time differential values 72 generated by the flow meter to the preselected time intervals. For a given pipe size, Table 1 shows some example transit time differential values (Δt), as well as fluid flow velocities, for a number of flowing fluids.

| Velocity (m/s) | Fluid | Speed of Sound (m/s) | Δt (micro second) |
|---|---|---|---|
| 0.5 | Ambient Air | 343 | 2.244 |
| 5 | Ambient Air | 343 | 22.44 |
| 0.25 | Ambient Water | 1482 | 0.00601 |
| 2.5 | Ambient Water | 1482 | 0.0601 |
| 1 | Natural Gas | 400 | 3.300 |
| 5 | Natural Gas | 400 | 16.50 |
| 20 | Natural Gas | 400 | 66.00 |

It will be understood that such data may be stored in the flow simulator or in an associated computer using conventional computer hardware, software and/or methods, and that the values shown in Table 1 are exemplary only and not intended to be limiting.

In one embodiment, calibration subsystem 66 compares the transit time differential value 72 generated by flow meter 10 to a preselected time interval, e.g. the time interval between when simulated transit time signal pulse 70 is transmitted and the time when simulated transit time signal pulse 70' is transmitted. The preselected time interval may be any selected time interval. Thus, a user can calibrate through a full range of simulated flows and is not limited by conditions which may not be present during normal operations or at the time of calibration of the flow meter. If transit time differential value 72 (Δt) is not equal to the preselected time interval, calibration subsystem 66 is configured to output calibration factor 76 to flow meter 10. Alternatively or in addition, calibration subsystem 66 compares the velocity value 74 generated by flow meter 10 to a calculated flow velocity calculated using the known preselected time interval. If velocity value 74 is not equal to the calculated flow velocity, calibration subsystem 66 is configured to output calibration factor 78 to flow meter 10. If for example either or both of these flow meter values is indeed equal to the preselected or predetermined values, the calibration factor could 1, or zero, depending on whether the calibration factor is a multiplier or an additive. Typically, calibration factor 76 will adjust the transit time differential value 72 (Δt) determined by flow meter 10, and calibration factor 78 will adjust the velocity value 74 (V) determined by flow meter 10.

In various embodiments, a preselected time interval between simulated transit time pulses 70 and 70' may be selected as discussed above, and a user may choose one or more such intervals which correspond to values in a table or database such as Table 1 where a known transit time differential can be associated with a particular type of fluid flowing at a blown velocity. For example, a user may choose a preselected time interval of 22.44 microseconds, which according to Table 1 may be representative of ambient air flowing at five (5) meters/second. Also in various embodiments, a calculated flow velocity may be representative of velocity for a particular type of fluid at the preselected time interval. For example, if a calculated velocity is 2.5 meters per second, according to Table 1 such a velocity may be representative of ambient water when the time interval between transit time pulses is 0.0601 microseconds.

Figure 5:
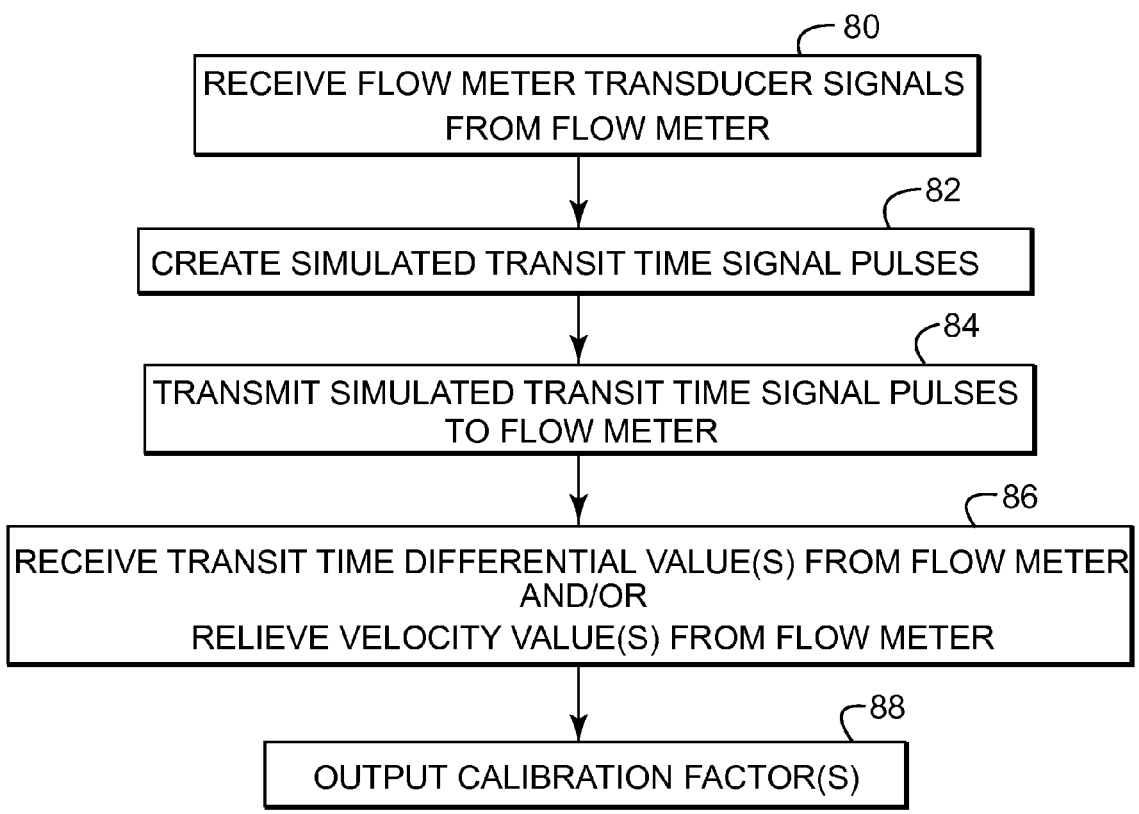
FIG. 5 is a schematic block diagram showing the primary processing steps of one embodiment of a flow simulator in accordance with the subject invention.

A summary of one configuration of the operation of flow simulator 60 is shown in flowchart form in FIG. 5. Receiver 62 receives transmitted flow meter transducer signals 68, 68' from flow meter 10, step 80. Using transmitted flow meter transducer signals 68, 68' from flow meter 10, simulation subsystem 64 creates simulated transit time signal pulses 70 and 70', step 82, and transmits them to flow meter 10 at a preselected time interval, step 84. Calibration subsystem 66 receives transit time differential value 72 and/or velocity value 74 generated by flow meter 10 based on the simulated transit time signal pulses 70 and 70', step 86, and outputs calibration factor(s) 76 and/or 78 to the flow meter, step 88. Although the steps set forth in FIG. 5 are set forth in a particular sequence, it will be understood that this sequence is not limiting, and that steps may be undertaken simultaneously or out of order, steps may be eliminated or added in accordance with various embodiments, and that one or more steps may be achieved at least in part utilizing electronic circuitry.

Figure 6:
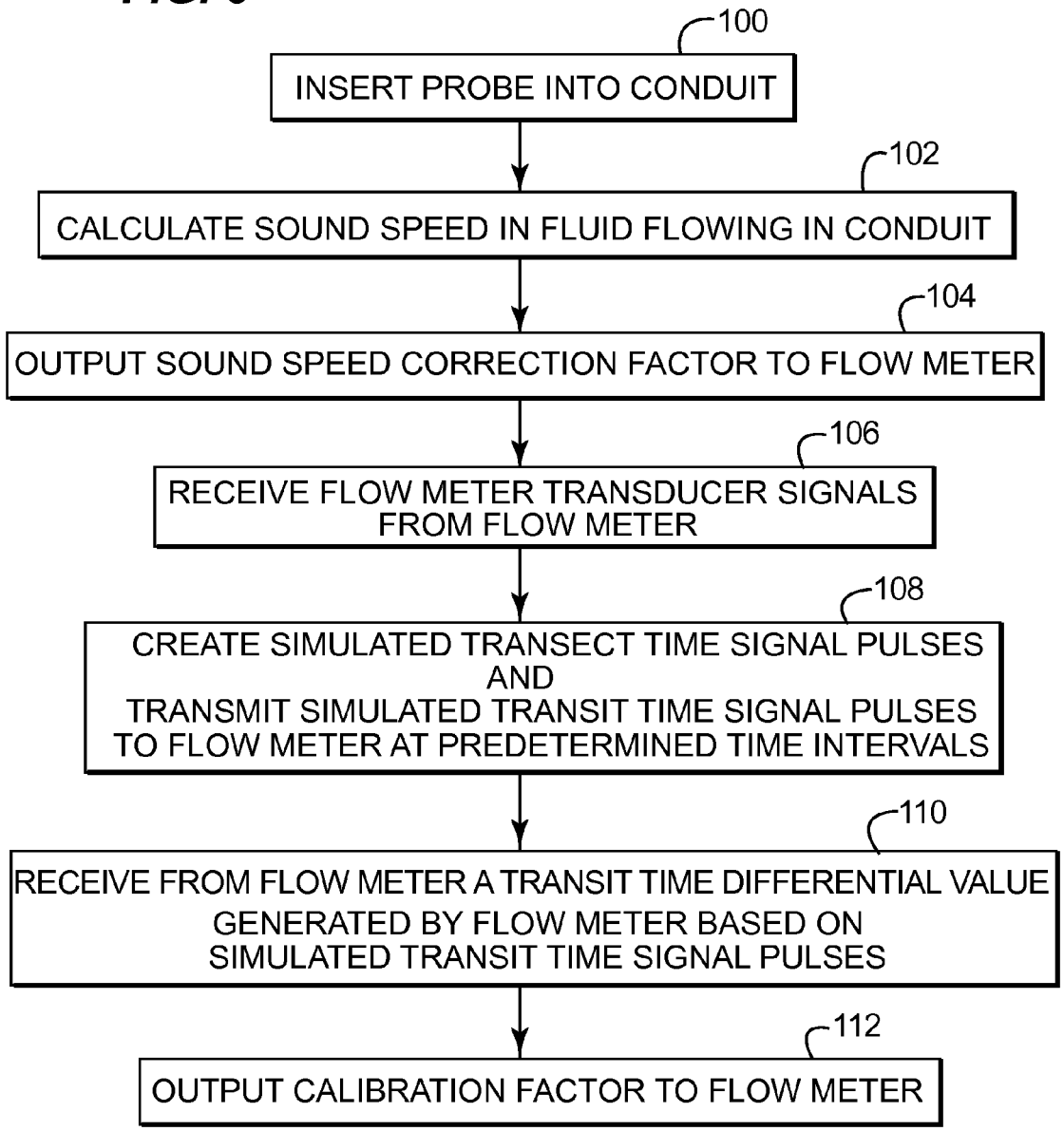
FIG. 6 is a schematic block diagram showing the primary method steps of one embodiment of a calibration method in accordance with the subject invention including both calibration of sound speed and transit time differential.

A summary of one embodiment of a method in accordance with the subject invention is shown in flowchart form in FIG. 6. A probe, such as probe 30 described herein, is inserted into a conduit, step 100, the sound speed is calculated, step 102, for example by processing subsystem 40, and a sound speed correction factor is output to a flow meter, step 104. Flow meter transducer signals are received from the flow meter, step 106, in one example by receiver 62 of flow simulator 60. Simulated transit time signal pulses are created and transmitted to the flow meter at predetermined time intervals, step 108, e.g. by simulation subsystem 64. A transit time differential value generated by the flow meter based on the simulated transit time signal pulses is received, step 110, for example by calibration subsystem 66, and a calibration factor is output to the flow meter, step 112. Although the steps set forth in FIG. 6 are set forth in a particular sequence, it will be understood that this sequence is not limiting, and that steps may be undertaken simultaneously or out of order, and that one or more steps may be achieved utilizing electronic circuitry.

As shown in FIG. 1, flow simulator 60 is connected to computer 80. Computer 80 may provide a mechanism for an operator to input commands to flow simulator 60, for example to control, distort or modulate the simulated transit time signal pulses sent back to the flow meter, and/or to display various outputs from flow simulator 60. This is not a necessary limitation, however, and in various configurations flow simulator 60 may be programmed or incorporated into computer 80, or alternatively, control, inputs, outputs and/or displays may be programmed or incorporated into flow simulator 60, depending upon a particular desired application. Notably also, in embodiments which include both flow simulator 60, probe 30 and processing subsystem 40, processing subsystem 40 may be part of or incorporated in either flow simulator 60 or computer 80 as desired for a particular application.

In other embodiments, flow meter calibration system 20 may include flow simulator 60 as an alternative, rather than an addition, to probe 30 and processing subsystem 40. In such a case, flow simulator 60 would operate in the same manner as described, but overall calibration of the flow meter would not include the flow meter sound speed correction factor provided by probe 30 and processor 40. For a majority of purposes, the calibration factor provided to the flow meter by flow simulator 60 alone will also result in required or desired flow meter accuracy. Co-pending patent application entitled "Flow Simulating Circuit for Testing of Flow Meters", filed Aug. 1, 2007 and including inventors herein and of the same assignee shows at least one example of a simulating circuit which may be used as a flow simulator or part thereof and is incorporated herein by reference.

Accordingly, it is clear that embodiments of the system and method of the subject invention provide cost-effective, less complex, and more precise calibration of flow meters in the field.

Various parts or portions of the systems, subsystems, modules and methods of the subject invention may be achieved utilizing electronic circuitry, and/or may be embedded in software as may be known to those skilled in the art, and/or may be part of a computer or other processor which may be separate from the remaining systems, although these examples are not meant to be limiting, and various parts or portions of the subject invention may be implemented as a computer and/or software program(s) stored on a computer readable medium in a computer and/or on a computer readable medium such as a tape or compact disk. The systems, subsystems, modules and methods of the present invention may also be implemented in a plurality of computers or devices, with the components residing in close physical proximity or distributed over a large geographic region and connected by a communications network, for example, or incorporated in one or more devices.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A calibration system for a flow meter, said calibration system including a flow simulator comprising:
a static receiver configured to receive flow meter transducer signals from a flow meter;
a simulation subsystem configured to create simulated transit time signal pulses and to transmit the simulated transit time signal pulses to the flow meter at preselected time intervals; and
a calibration subsystem configured to:
receive from the flow meter a transit time differential value generated by the flow meter based on the simulated transit time signal pulses; and
output a calibration factor to the flow meter.

2. The system of claim 1 in which the receiver is configured to receive transmitted flow meter transducer signals from the flow meter.

3. The system of claim 2 in which the simulation subsystem is configured to create the simulated transit time signal pulses using the transmitted flow meter transducer signals received from the flow meter.

4. The system of claim 3 in which the calibration subsystem is further configured to compare the transit time differential value generated by the flow meter to a j preselected time interval to compute the calibration factor.

5. The system of claim 3 in which the calibration subsystem is configured to receive from the flow meter a fluid flow velocity value generated by the flow meter based on the simulated transit time signal pulses.

6. The system of claim 5 in which the calibration subsystem is further configured to compare the fluid flow velocity value generated by the flow meter to a fluid flow velocity calculated by the flow simulator to compute the calibration factor.

7. The system of claim 1 in which the calibration factor adjusts the transit time differential value generated by the flow meter.

8. The system of claim 6 in which the calibration factor adjusts the fluid flow velocity value generated by the flow meter.

9. The system of claim 1 in which the simulated transit time signal pulses are based on actual flow meter transit time signal pulses from the flow meter.

10. The system of claim 1 in which the simulation subsystem is further configured to distort the simulated transit time signal pulses to simulate noise factors interfering with the pulses.

11. The system of claim 1 in which the simulation subsystem is further configured to modulate signal qualities of the simulated transit time signal pulses.

12. The system of claim 11 in which the signal qualities include at least one of amplitude and frequency.

13. The system of claim 4 in which the preselected time interval is representative of a transit time differential value for a particular type of fluid flowing at a known velocity.

14. The system of claim 6 in which the calculated flow velocity is representative of velocity for a particular type of fluid at a preselected time interval.

15. The system of claim 1 further including: a probe for insertion into a conduit with fluid flowing therein; and a processing subsystem connected to the probe and configured to calculate sound speed in the fluid and to output a sound speed correction factor to the flow meter.

16. The system of claim 15 in which the probe is shaped to fit into an opening in the conduit.

17. The system of claim 16 in which the probe includes at least two transducers spaced a fixed distance apart and at least one aperture for the fluid to flow through the probe, said probe transducers configured to transmit and receive ultrasonic signals and to output transit time signals.

18. The system of claim 16 in which the probe includes at least one transducer and a reflector spaced a fixed distance apart and at least one aperture for the fluid to flow through the probe, said at least one probe transducer configured to transmit ultrasonic signals, receive ultrasonic signals reflected back from the reflector, and to output transit time signals.

19. The system of claim 17 in which the probe transducers define an ultrasonic signal path through the fluid.

20. The system of claim 19 in which the processing subsystem is further configured to: excite the probe transducers, and respond to the transit time signals output by the probe transducers to calculate the sound speed in the fluid.

21. The system of claim 20 in which the processing subsystem is further configured to receive from the flow meter a fluid sound speed value determined by the flow meter.

22. The system of claim 21 in which the processing subsystem is further configured to compare the fluid sound speed value determined by the flow meter to the calculated sound speed to compute the sound speed correction factor.

23. The system of claim 15 in which the flow meter is a flare gas flow meter and the fluid is a flare gas.

24. The system of claim 15 in which the probe is portable.

25. The system of claim 15 in which the probe is pre-calibrated.

26. The system of claim 15 in which the probe is less than or equal to ¾ inches in diameter.

27. The system of claim 17 in which the probe transducers are moveable within the probe.

28. The system of claim 27 in which the processing subsystem is further configured to output a series of sound speeds representing a fluid sound speed profile.

29. The system of claim 18 in which the reflector is moveable within the probe.

30. The system of claim 29 in which the processing subsystem is further configured to output a series of sound speeds representing a fluid sound speed profile.

31. A calibration system for a flow meter, said calibration system including a flow simulator comprising:
   a static receiver configured to receive transmitted flow meter transducer signals from a flow meter;
   a simulation subsystem configured to create simulated transit time signal pulses using the transmitted flow meter transducer signals received from the flow meter and to transmit the simulated transit time signal pulses to the flow meter at preselected time intervals; and
   a calibration subsystem configured to:
   receive from the flow meter a transit time differential value generated by the flow meter based on the simulated transit time signal pulses, compare the transit time differential value generated by the flow meter to a preselected time interval to compute a calibration factor to adjust the transit time differential value generated by the flow meter, and
      output the calibration factor to the flow meter.

32. A calibration system for a flow meter, said calibration system including a flow simulator comprising:
   a static receiver configured to receive flow meter transducer signals from a flow meter;
   a simulation subsystem configured to create simulated transit time signal pulses based on actual transit time signal pulses from the flow meter, and to transmit the simulated transit time signal pulses to the flow meter at preselected time intervals; and
   a calibration subsystem configured to:
   receive from the flow meter a transit time differential value generated by the flow meter based on the simulated transit time signal pulses, compare the transit time differential value generated by the flow meter to a preselected time interval to compute a calibration factor; and
      output the calibration factor to the flow meter.

33. A calibration system for a flow meter comprising:
   a probe for insertion into a conduit with fluid flowing therein;
   a processing subsystem connected to the probe and configured to calculate sound speed in the fluid, and output a sound speed correction factor to the flow meter;
   a flow simulator comprising:
   a static receiver configured to receive flow meter transducer signals from the flow meter,
   a simulation subsystem configured to create simulated transit time signal pulses and to transmit the simulated transit time signal pulses to the flow meter at preselected time intervals, and
   a calibration subsystem configured to:
   receive from the flow meter a transit time differential value generated by the flow meter based on the simulated transit time signal pulses, and
   output a calibration factor to the flow meter.

34. A calibration system for a flow meter comprising:
   a probe including at least two transducers spaced a fixed distance apart and at least one aperture for fluid to flow through the probe, said transducers configured to transmit and receive ultrasonic signals and to output transit time signals;
   a processing subsystem for exciting the probe transducers and responsive to the transit time signals and configured to:
   calculate sound speed in a fluid flowing through the probe, and
   output a sound speed correction factor to a flow meter;
   a flow simulator comprising:
   a static receiver configured to receive transmitted flow meter transducer signals from the flow meter,
   a simulation subsystem configured to create simulated transit time signal, pulses using the transmitted flow meter transducer signals received from the flow meter and to transmit the simulated transit time signal pulses to the flow meter at preselected time intervals, and
   a calibration subsystem configured to:
   receive from the flow meter at least one of a transit time differential value and a fluid flow velocity value generated by the flow meter based on the simulated transit time signal pulses, and
   output a calibration factor to the flow meter.

35. A calibration method for a flow meter comprising;
   statically receiving flow meter transducer signals from a flow meter;
   creating simulated transit time signal pulses and transmitting the simulated transit time signal pulses to the flow meter at preselected time intervals;
   receiving from the flow meter a transit time differential value generated by the flow meter based on the simulated transit time signal pulses; and
   outputting a calibration factor to the flow meter.

36. The method of claim 35 in which the flow meter transducer signals received are transmitted flow meter transducers signals.

37. The method of claim 36 in which the simulated transit time signal pulses are created using the transmitted flow meter transducer signals received from the flow meter.

38. The method of claim 37 further including comparing the transit time differential value generated by the flow meter to a preselected time interval to compute the calibration factor.

39. The method of claim 37 further including receiving from the flow meter a fluid flow velocity value generated by the flow meter based on the simulated transit time signal pulses.

40. The method of claim 39 further including comparing the fluid flow velocity value generated by the flow meter to a fluid flow velocity calculated by the flow simulator to compute the calibration factor.

41. The method of claim 38 in which the calibration factor adjusts the transit time differential value generated by the flow meter.

42. The method of claim 40 in which the calibration factor adjusts the fluid flow velocity value generated by the flow meter.

43. The method of claim 35 in which the simulated transit time signal pulses are based on actual flow meter transit time signal pulses from the flow meter.

44. The method of claim 35 further including distorting the simulated transit time signal pulses to simulate noise factors interfering with the pulses.

45. The method of claim 35 further including modulating signal qualities of the simulated transit time signal pulses.

46. The method of claim 45 in which the signal qualities include at least one of amplitude and frequency.

47. The method of claim 38 in which the preselected time interval is representative of a transit time differential value for a particular type of fluid flowing at a known velocity.

48. The method of claim 40 in which the calculated flow velocity is representative of velocity for a particular type of fluid at a preselected time interval.

49. The method of claim 35 further comprising: inserting a probe into a conduit with fluid flowing therein; calculating the sound speed in the fluid, and outputting a sound speed correction factor to the flow meter.

50. The method of claim 49 in which the probe is shaped to fit into an opening in the conduit.

51. The method of claim 49 in which the probe includes at least two transducers spaced a fixed distance apart and at least one aperture for the fluid to flow through the probe, said probe transducers configured to transmit and receive ultrasonic signals and to output transit time signals.

52. The method of claim 49 in which the probe includes at least one transducer and a reflector spaced a fixed distance apart and at least one aperture for the fluid to flow through the probe, said probe transducer configured to transmit ultrasonic signals, receive ultrasonic signals reflected back from the reflector, and to output transit time signals.

53. The method of claim 51 in which the probe transducers define an ultrasonic signal path through the fluid.

54. The method of claim 53 further including the steps of exciting the probe transducers and responding to the transit time signals output by the probe transducers to calculate the sound speed in the fluid.

55. The method of claim 54 further including receiving from the flow meter a fluid sound speed value determined by the flow meter.

56. The method of claim 55 further including comparing the fluid sound speed value determined by the flow meter with the calculated sound speed to compute the sound speed correction factor.

57. The method of claim 49 in which the flow meter is a flare gas flow meter and the fluid is a flare gas.

58. The method of claim 49 in which the probe is portable.

59. The method of 49 in which the probe is pre-calibrated.

60. The method of claim 49 in which the probe is less than or equal to ¾ inches in diameter.

61. The method of claim 51 in which the probe transducers are moveable within the probe.

62. The method of claim 61 including outputting a series of sound speeds representing a fluid sound speed profile.

63. The method of claim 52 in which the probe reflector is moveable with the probe.

64. The method of claim 63 including outputting a series of sound speeds representing a fluid sound speed profile.

65. A calibration method for a flow meter comprising:
statically receiving transmitted flow meter transducer signals from a flow meter;
creating simulated transit time signal pulses using the transmitted flow meter transducer signals received from the flow meter and transmitting the simulated transit time signal pulses to the flow meter at preselected time intervals;
receiving from the flow meter a transit time differential value generated by the flow meter based on the simulated transit time signal pulses;
comparing the transit time differential value generated by the flow meter to a preselected time interval to compute a calibration factor to adjust the transit time differential value generated by the flow meter; and
outputting the calibration factor to the flow meter.

66. A calibration method for a flow meter comprising,
statically receiving flow meter transducer signals from a flow meter;
creating simulated transit time signal pulses based on actual transit time signals pulses from the flow meter and transmitting the simulated transit time signal pulses to the flow meter at preselected time intervals;
receiving from the flow meter a transit time differential value generated by the flow meter based on the simulated transit time signal pulses;
comparing the transit time differential value generated by the flow meter to a preselected time interval to compute a calibration factor; and
outputting the calibration factor to the flow meter.

67. A calibration method for a flow meter comprising:
inserting a probe into an opening in a conduit with fluid flowing therein;
calculating the sound speed in the fluid;
outputting a sound speed correction factor to a flow meter;
statically receiving flow meter transducer signals from the flow meter;
creating simulated transit time signal pulses and transmitting the simulated transit time signal pulses to the flow meter at preselected time intervals;
receiving from the flow meter a transit time differential value generated by the flow meter based on the simulated transit time signal pulses; and
outputting a calibration factor to the flow meter.

68. A calibration method for a flow meter comprising:
inserting a probe into an opening in a conduit with fluid flowing therein, the probe including at least two transducers spaced a fixed distance apart and at least one aperture for the fluid to flow through the probe, said transducers configured to transmit and receive ultrasonic signals and to output transit time signals;
exciting the probe transducers;
responding to the transit time signals and calculating sound speed in the fluid flowing in the conduit through the probe;
outputting a sound speed correction factor to a flow meter;
statically receiving transmitted flow meter transducer signals from the flow meter;
creating simulated transit time signal pulses using the transmitted flow meter transducer signals received from the flow meter;
transmitting the simulated transit time signal pulses to the flow meter at preselected time intervals;
receiving from the flow meter a transit time differential value generated by the flow meter based on the simulated transit time signal pulses; and
outputting a calibration factor to the flow meter.

* * * * *

UNITED STATES PATENT AND TRADEMARK OFFICE
CERTIFICATE OF CORRECTION

| | | |
|---|---|---|
| PATENT NO. | : 7,984,637 B2 | Page 1 of 1 |
| APPLICATION NO. | : 11/774215 | |
| DATED | : July 26, 2011 | |
| INVENTOR(S) | : Ao et al. | |

It is certified that error appears in the above-identified patent and that said Letters Patent is hereby corrected as shown below:

In Fig. 3, Sheet 4 of 7, for Tag "44", in Line 1, delete "TRANSCUCERS" and insert -- TRANSDUCERS --, therefor.

In Column 11, Line 53, delete "blown" and insert -- known --, therefor.

In Column 12, Line 62, delete "thereof" and insert -- thereof, --, therefor.

In Column 13, Line 42, after "in the", insert -- art cannot reasonably be --.

In Column 14, Line 7, in Claim 4, delete "to a j" and insert -- to a --, therefor.

In Column 16, Line 27, in Claim 34, delete "signal," and insert -- signal --, therefor.

In Column 16, Line 37, in Claim 35, delete "comprising;" and insert -- comprising: --, therefor.

In Column 17, Line 53, in Claim 59, delete "of 49" and insert -- of claim 49 --, therefor.

In Column 18, Line 14, in Claim 66, delete "comprising," and insert -- comprising: --, therefor.

Signed and Sealed this
Eleventh Day of September, 2012

David J. Kappos
*Director of the United States Patent and Trademark Office*